Oct. 25, 1949.  A. L. PARKER  2,485,915
VALVE ASSEMBLY
Filed April 8, 1944
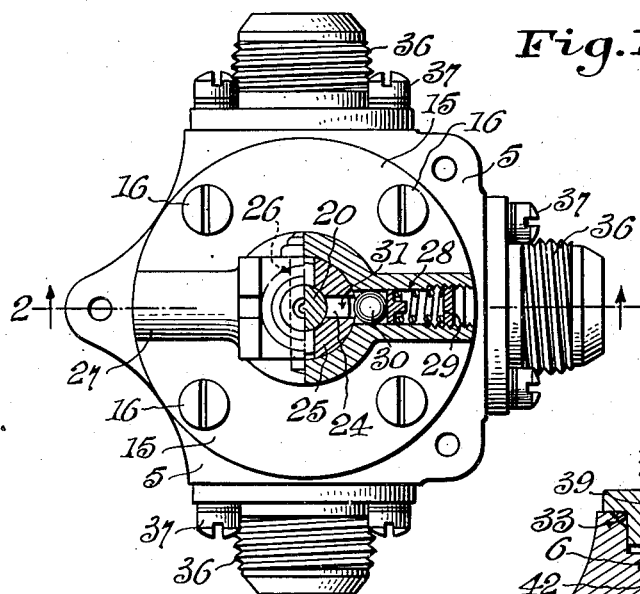
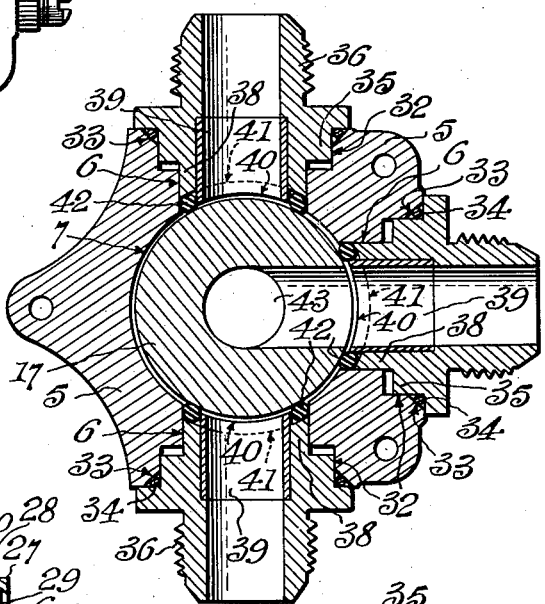
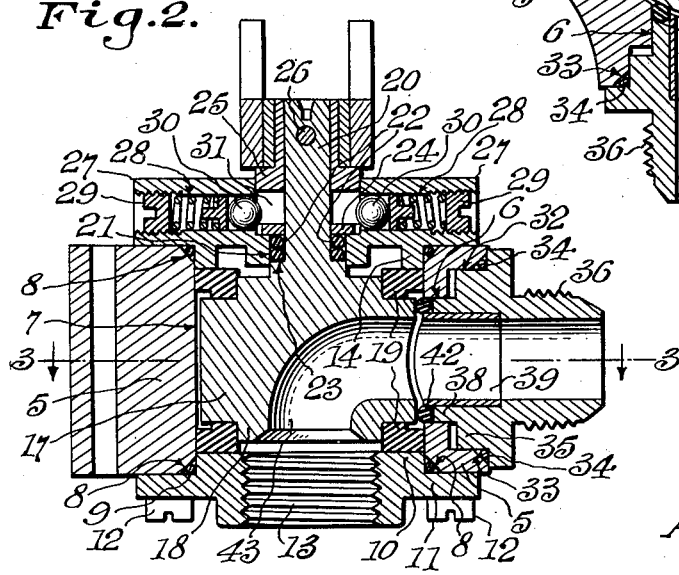
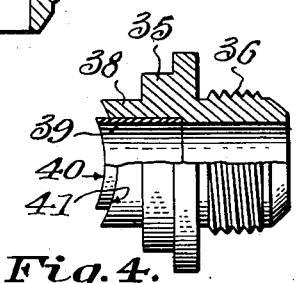
Inventor
Arthur L. Parker.
By Nason, Porter & Diller
Attorneys Patented Oct. 25, 1949 2,485,915

UNITED STATES PATENT OFFICE 2,485,915

VALVE ASSEMBLY

Arthur L. Parker, Cleveland, Ohio, assignor to The Parker Appliance Company, Cleveland, Ohio, a corporation of Ohio Application April 8, 1944, Serial No. 530,172

1 Claim. (Cl. 251—113)

The invention relates generally to valves and primarily seeks to provide a novel valve structure embodying a casing having at least one inlet port and at least one outlet port, a rotor having a flow passage therethrough and turnable for permitting or preventing flow of fluid through said ports and passage, and sealing ring means carried by the casing and surrounding a port therein and yieldably engaging the rotor for sealing off the ring surrounded port when the rotor is turned so as to place the flow passage therein out of registry with said ring surrounded port.

An object of the invention is to provide a valve structure of the character stated in which the port sealing ring is mounted in a groove formed in the casing and surrounding the port to be sealed.

Another object of the invention is to provide novel means for forming the ring receiving groove or grooves in the valve casing.

Another object of the invention is to provide novel sealing ring receiving groove forming means of the character stated in which the outer wall of the groove surrounding the casing port is provided in a bore carried by the casing and concentrically surrounding the casing port, and the inner wall of said groove is provided by a sleeve forming an extension of said port and having its inner end shaped to conform to the curvature of the adjacent rotor wall portion.

Another object of the invention is to provide novel sealing ring receiving groove forming means of the character stated in which the outer wall of the groove surrounding the port is provided in a bore in the casing and the casing port is formed in a port adapter attached to the casing and having an extension through which the port passes inserted part way into said bore, the inner wall of said groove being provided by a sleeve forming an extension of the port and projecting a distance inwardly beyond the adapter extension, the adapter extension end and the sleeve end being shaped to conform to the curvature of the adjacent rotor, and said adapter extension end constituting the floor of the groove.

With the above and other objects in view that will hereinafter appear, the nature of the invention will be more clearly understood by reference to the following detailed description, the appended claim, and the several views illustrated in the accompanying drawings.

In the drawings:

Figure 1 is a plan view of a valve structure embodying the invention, parts being broken away and in section.

Figure 2 is a vertical cross section taken on the line 2—2 on Figure 1.

Figure 3 is a horizontal section taken on the line 3—3 on Figure 2.

Figure 4 is a detailed side elevation and part longitudinal section illustrating one of the port adapters attached to the valve casing of Figures 1 to 3.

In the disclosure herein presented exemplifying the invention, the novel features are shown as incorporated in a valve in which the casing has three inlet or delivery ports arranged in a common horizontal plane and a single downwardly directed inlet or outlet port, and the rotor has an elbow flow passage turnable into registry with a selected one of the group of three ports for bringing about flow communication between the selected one of the three ports and the downwardly directed port, or the rotor can be turned to close off communication with all three of the horizontally disposed ports.

The valve structure includes a casing 5 having three radially disposed bores 6 all arranged in a common horizontal plane. Each of the bores 6 opens into a large cylindriform rotor bore 7, and each end of the rotor bore is chamfered as at 8 to provide a seat for a sealing ring 9. The sealing ring at the bottom of the valve surrounds a boss 10 extending from a closure cap 11 which is screw secured as at 12 to said casing and which holds the ring in tight sealing contact with its seat. The cap 11 is equipped with a central inlet or discharge port 13.

The sealing ring or gasket 9 at the top of the valve surrounds a boss 14 extending from a closure cap 15 which is screw secured as at 16 to the casing, and the boss 16, like the previously mentioned cap boss 14, extends into the respective end of the rotor bore 7.

A valve rotor 17 is freely rotatably mounted in the rotor bore 7 and is equipped with bearing hubs 18 at the respective ends thereof which are rotatably received in non-metallic bearing rings 19 mounted in the casing in a manner clearly illustrated in Figure 2. The rotor includes a reduced diameter stem extension 20 which passes through a center bore 21 in the cap 15 wherein it is surrounded by packing rings 22 disposed between the stem shoulder 23 and an abutment ring 24 surrounding the same in spaced relation to said shoulder.

The cap 15 also has a counterbore within which is received the collar 25 which is pin secured as at 26 upon the end of the rotor stem which extends out of the casing. The cap 15 also is equipped with a raised rib 27 having a longitudinal bore 28 therethrough in each end of which is threadably mounted an abutment screw 29 and a spring pressed ball or detent 30. Each ball or detent 30 is engageable in a recess 31 formed in the external surface of the collar 25, four such recesses being provided in equidistantly spaced relation. The spring pressed elements 30 serve to yieldably hold the rotor in selected positions or stations each disposed in ninety degree spaced relation about the rotor center. Thus the rotor will be yieldably held in the off position in which its flow passage will be out of communication with all of the casing ports, or it will be yieldably held in position for registering its flow passage with any selected one of the casing ports in the manner clearly illustrated in Figures 2 and 3 of the drawings.

Each radial bore 6 in the casing opens outwardly into a counterbore 32 which is chamfered at its outer end as at 33 to form a seat for a gasket or sealing ring 34. Each sealing ring surrounds the boss 35 of a port adapter 36 which is screw secured to the casing as at 37 and serves to hold the respective sealing ring 34 in tight sealing contact with its seat 33. It will be apparent by reference to Figures 2 and 3 that the boss 35 of each port adapter snugly fits the respective counterbore 32, and each port adapter includes a reduced diameter and extension which is dimensioned to snugly fit the respective radial bore 6 but terminates short of the inner end thereof. Each port adapter also is fitted with a sleeve 39 which forms an extension of the valve port extending through the adapter and extends a short distance inwardly beyond the end of the reduced extension 38. It will be observed by reference to Figures 2, 3 and 4, and especially to the latter, that the inner end of each sleeve 39 and the inner end of the respective adapter extension 38 are rounded at 40 and 41 respectively to conform to the shape of the adjacent surface of the rotor 17.

It will be apparent by reference to Figures 2 and 3 of the drawings that the inner wall of each casing bore 6, the outer wall of each sleeve 40 and the inner end extremity of each port adapter extension 38, cooperate in the provision of an annular groove surrounding the respective casing port and adapted to receive a sealing ring 42. The end extremity of the port adapter extension 38 in each case forms the bottom or floor of the respective sealing ring receiving groove, and each said extension extremity is so spaced from the adjacent rotor surface as to cause the respective sealing ring to extend slightly from its mounting groove and engage in yieldable sealing contact with said adjacent rotor surface.

The rotor 17 is provided with an elbow flow passage 43 which constantly communicates with the casing port 13 at one end and has its other end presented for selective communication with the several casing ports in the manner hereinbefore described. It will be obvious by reference to Figures 2 and 3 of the drawings that the casing port surrounding sealing rings 42 will constantly engage the external surface of the rotor 17 and will effectively seal off every casing port with which the rotor flow passage 43 is out of communication and also will seal off the fluid passing through the rotor passage 43 and a selected or registering casing port so that said fluid cannot freely pass into the space surrounding the rotor and between the bearing rings 19.

While one specific embodiment of the invention has been described in detail herein, it is to be understood that this disclosure covers only an example of embodiment of the invention, and the valve structure herein disclosed may be variously modified without departing from the spirit and scope of the invention as defined in the appended claim.

I claim:

In a valve structure, a casing having a cylindrical chamber and a bore communicating with the latter, a cylindrical rotor operatively disposed in said chamber and having a flow passage therethrough opening at the peripheral wall of the rotor, a port-adapter removably secured in said bore and having an extension whose inner edge terminates short of the cylindrical wall of said chamber, said port-adapter having a port therethrough, a sleeve fitted in said port-adapter and having its inner edge disposed inwardly beyond the first-mentioned edge terminating short of said cylindrical wall whereby a groove is formed between said inner edge of the extension, the peripheral wall of the rotor, the wall in said bore and outer surface of said sleeve, a yieldable gasket disposed in said groove, the rotation of the rotor serving to control communication between said passage and sleeve, and the said inner edges and peripheral wall of the rotor being concentric.

ARTHUR L. PARKER.

REFERENCES CITED

The following references are of record in the file of this patent:

UNITED STATES PATENTS

| Number | Name | Date |
|---|---|---|
| 783,953 | Henry | Feb. 28, 1905 |
| 1,784,381 | O'Stroske | Dec. 9, 1930 |
| 1,999,496 | Adams | Apr. 30, 1935 |
| 2,201,895 | Glen | May 21, 1940 |
| 2,290,349 | Ohls | July 21, 1942 |
| 2,310,583 | Johnson | Feb. 9, 1943 |

FOREIGN PATENTS

| Number | Country | Date |
|---|---|---|
| 520,188 | Germany | Mar. 9, 1931 |
| 676,093 | France | Nov. 18, 1929 |